United States Patent
Chatterjee et al.

(10) Patent No.: US 8,260,757 B1
(45) Date of Patent: Sep. 4, 2012

(54) DATA ACCESS LAYER

(75) Inventors: Amlan Chatterjee, Santa Clara, CA (US); Chirag R. Shah, Foster City, CA (US); Mohan Kishore, Foster City, CA (US); Jack P. Hsu, Palo Alto, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 159 days.

(21) Appl. No.: 12/765,226

(22) Filed: Apr. 22, 2010

(51) Int. Cl.
*G06F 17/30* (2006.01)
*G06F 17/00* (2006.01)

(52) U.S. Cl. ........ 707/703; 707/769; 707/959; 709/202; 709/203; 709/204; 709/215; 370/230; 370/352

(58) Field of Classification Search ............... 707/703, 707/769, 959; 709/1, 202–204, 215; 370/230, 370/352
See application file for complete search history.

(56) References Cited

U.S. PATENT DOCUMENTS

| | | | |
|---|---|---|---|
| 6,850,942 B2* | 2/2005 | Cotner et al. | 707/703 |
| 6,950,848 B1* | 9/2005 | Yousefi'zadeh | 709/203 |

* cited by examiner

*Primary Examiner* — Yicun Wu
(74) *Attorney, Agent, or Firm* — David R. Stevens; Stevens Law Group

(57) ABSTRACT

An improved data access layer (DAL) architecture enables database connection pooling or multiplexing across machine boundaries. Drivers installed at web servers communicate with servers in a DAL. The DAL servers present a virtual database to the web servers, and the DAL servers in turn open connections to a set of physical databases. DAL servers are able to recycle connections that are no longer needed, or to move available connections from one DAL server to another, so as to provide improved efficiency in connection management, burst management, and peak load management. Scalability is thereby improved, and more efficient use of system resources is facilitated.

39 Claims, 9 Drawing Sheets

DATA ACCESS LAYER

FIELD OF THE INVENTION

The present invention relates to systems and methods for performing data transactions with respect to data stored in a relational database, and more particularly to a unique abstraction or data access layer for facilitating such data transactions across multiple types and instances of databases.

DESCRIPTION OF THE RELATED ART

Data access layers are a mechanism for providing access to data stored in persistent storage, such as a relational database. Data Access Layers are often used in implementing high performance, scalable e-commerce websites. Rather than making calls directly to databases, applications running on application servers can make calls to a Data Access Layer (DAL) which acts as a logical entity between a web server and a physical database. The application running on the web server can then use data retrieved via the DAL in generating output for presentation to end users via the website. The use of a DAL provides improved scalability in transactional database architectures and facilitates database partitioning and migration while minimizing disruption to system operations.

Many conventional DAL architectures employ an object-relational mapping that facilitates establishment of a logical entity with which a web server can interact. The DAL is thus able to act as an intermediary between web servers and databases. However, existing DAL architectures fail to provide robust mechanisms for handling sudden or extreme fluctuations in data load, and can therefore be overloaded if a large number of connections are needed in a short period of time. In general, such conventional architectures do not facilitate connection pooling across machine boundaries, thus limiting the ability of the system to react to sudden changes in load. One machine may be overloaded while another has excess capacity.

What is needed is a new DAL architecture that facilitates connection pooling across machine boundaries. What is further needed is a DAL architecture that permits database partitioning and migration, ensures scalability, and also provides maximum flexibility in managing overall system load. What is further needed is a system that does the above without requiring major changes in application code or web server operation.

SUMMARY OF THE INVENTION

In various embodiments, the present invention provides an improved Data Access Layer (DAL) architecture that enables database connection pooling or multiplexing across machine boundaries. The present invention thereby improves scalability and makes more efficient use of system resources; a machine that has excess capacity can share that extra capacity with another machine that would otherwise be resource-exhausted. The system of the present invention thus provides improved responsiveness and reliability, as well as greater efficiency in resource utilization. In addition, the techniques described herein can be implemented without necessitating extensive changes to existing applications or web server operations.

According to the techniques of the present invention, a Java Database Connectivity (JDBC) driver installed at each web server (or any server in a farm that needs to access data in a database) communicates with servers in a Data Access Layer (DAL). The DAL servers present a logical or virtual database to the web servers, and the DAL servers in turn provide connections to a set of physical databases. Such an arrangement allows the DAL servers to recycle connections that are no longer needed, or to move available connections from one DAL server to another, so as to provide improved efficiency in connection management, burst management, and peak load management.

In another embodiment, the present invention provides an opportunity to partition existing large databases to form multiple smaller databases. Since database connections for the web servers are provided by a shared resource abstraction (the DAL servers), in this embodiment the invention provides a unique opportunity to route a requested connection transparently to any database it deems appropriate.

For example, if a large legacy database needs to be split up into multiple smaller databases, this invention provides an effective way of doing so without using a custom configuration. The migration of data can thereby be accomplished without the need for significant changes to client code.

In one embodiment, the techniques of the present invention can be implemented with no substantial changes to web server code or client code. The improved DAL of the present invention operates at an intermediate layer that minimizes disruption to existing operations. The DAL thus provides a centralized access point for accessing persistent data stored in one or more databases. Changes to databases, and/or migration to new databases, are made easier by the support of an extensible routing framework. In addition, the system of the present invention improves flexibility in data access operations by abstracting actual data access mechanisms.

In addition, in one embodiment the present invention provides support for code running on the database itself, such as PL/SQL (Procedural Language/Structured Query Language) code, so that no changes to database operations are needed.

In one embodiment, the system of the present invention includes drivers installed at web servers so as to enable communication between the web servers and the DAL. In one embodiment, the drivers conform to the JDBC (Java Database Connectivity) 2.0 specification. In turn, drivers at the DAL provide functionality for enabling communication with physical databases. In this manner, the present invention allows any logical database to be mapped to one or more physical databases, with minimum disruption and maximum transparency from the point of view of the web server.

The present invention also provides the ability for a web server's data request to be serviced by any number of databases. Since the DAL handles the request from the web server, the DAL can communicate with, transact with, and/or retrieve data from any number of physical databases, and can dynamically present a view of the gathered data to the web server as though it were from a single database. Such an arrangement not only simplifies operation of the web server and further improves scalability, but also makes very large scale data organization extremely flexible.

The present invention also provides routing logic to ensure that data requests are handled by databases having sufficient capacity and resources. In one embodiment, the DAL includes such routing logic so that the selection of a database and the handling of the request and response to and from the database are transparent to the web server. The routing logic can be based on any number of different parameters, including but not limited to the client machine's name, IP address, the SQL query being executed, the default target database, and the like.

Accordingly, the present invention provides several improvements and advantages over prior systems for database connectivity. The DAL of the present invention provides a centralized location for handling all database calls made by applications and provides a transparent mechanism to route such calls to multiple databases and/or partitions as necessary. This promotes a looser coupling between the applications and the database, which makes the architecture more flexible and scalable. In one embodiment, the DAL of the present invention is implemented using a JDBC driver implementation, lightweight TCP NIO (New I/O) server, and routing mechanism. A load balancer can also be provided for directing client requests among DAL servers.

The DAL of the present invention can run in both client (local) and server (remote) modes. It has the ability to route client requests to particular databases, and supports stored procedure calls with multiple out parameters (result set).

In one embodiment, in response to a request from application code for a connection to a logical database established by the DAL, a database connection from a connection pool is provided. Using this connection, the application code creates a callable statement (data transaction request). When the statement is executed, an actual connection to a physical database is obtained from an internal DAL connection pool. The statement is then executed, and a result set is returned to the client.

By providing connection multiplexing, the system of the present invention facilitates sharing of database connections across machine boundaries. Connection multiplexing potentially reduces the total number of connections needed, and provides improved handling of sudden changes in demand for connections. By providing a logical layer between web servers and databases, and by routing requests to physical databases according to load and capacity, the system of the present invention implements an efficient, transparent mechanism for improving resource utilization and scalability.

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

DETAILED DESCRIPTION OF THE EMBODIMENTS

Architecture

Figure 1:
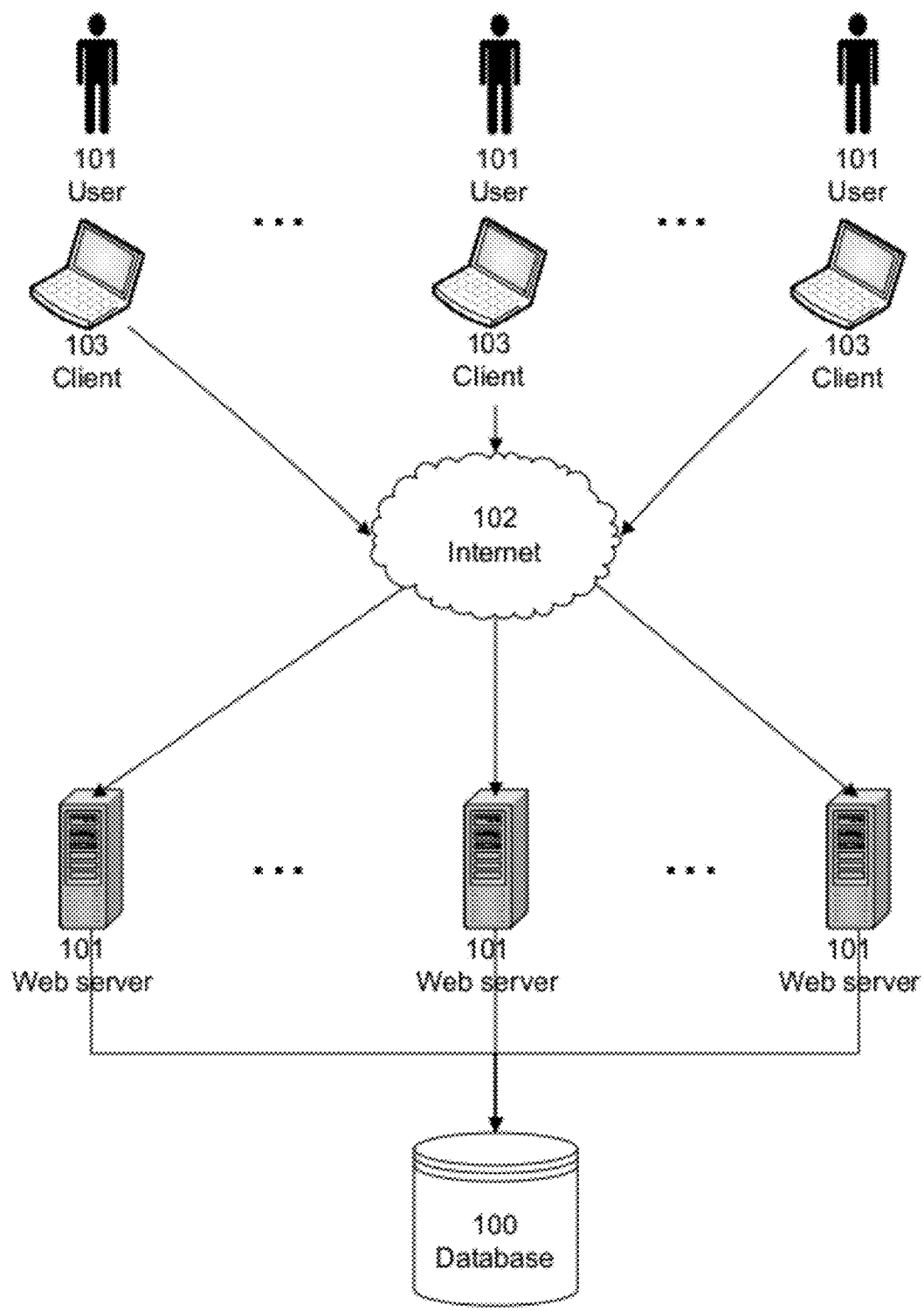
FIG. 1 is a block diagram depicting an example of an architecture wherein web servers communicate directly with a database, according to the prior art.

Referring now to FIG. 1, there is shown a block diagram depicting an example of an architecture wherein web servers 101 communicate directly with a database 100, according to the prior art. Database 100 may be any type of database, such as for example a SQL (Structured Query Language) relational database.

Any number of web servers 101 can be connected in such a manner, so as to implement a website such as an e-commerce website. Users 101 interact with a web page via browsers operating on client machines 103. Page requests from clients 103 are received at web servers 101 via a network such as the Internet 102, using well known protocols such as TCP/IP (Transmission Control Protocol/Internet Protocol) and HTTP (Hypertext Transfer Protocol). In response to such requests, web servers 101 communicate with database 100 to perform data transactions, including retrieving, modifying, adding to, and/or otherwise manipulating data on database 100. Each web server 101 communicates directly with database 101 using known network communication protocols.

In an arrangement such as shown in FIG. 1, each web sever 101 must make its own individual connection to database 100. Since database 100 may have a limited number of available connections, peak levels of traffic can cause database 100 to run out of available connections. In such situations, web server 101 may be unable to connect, and users may experience delays, crashes, and other problems.

Figure 2:
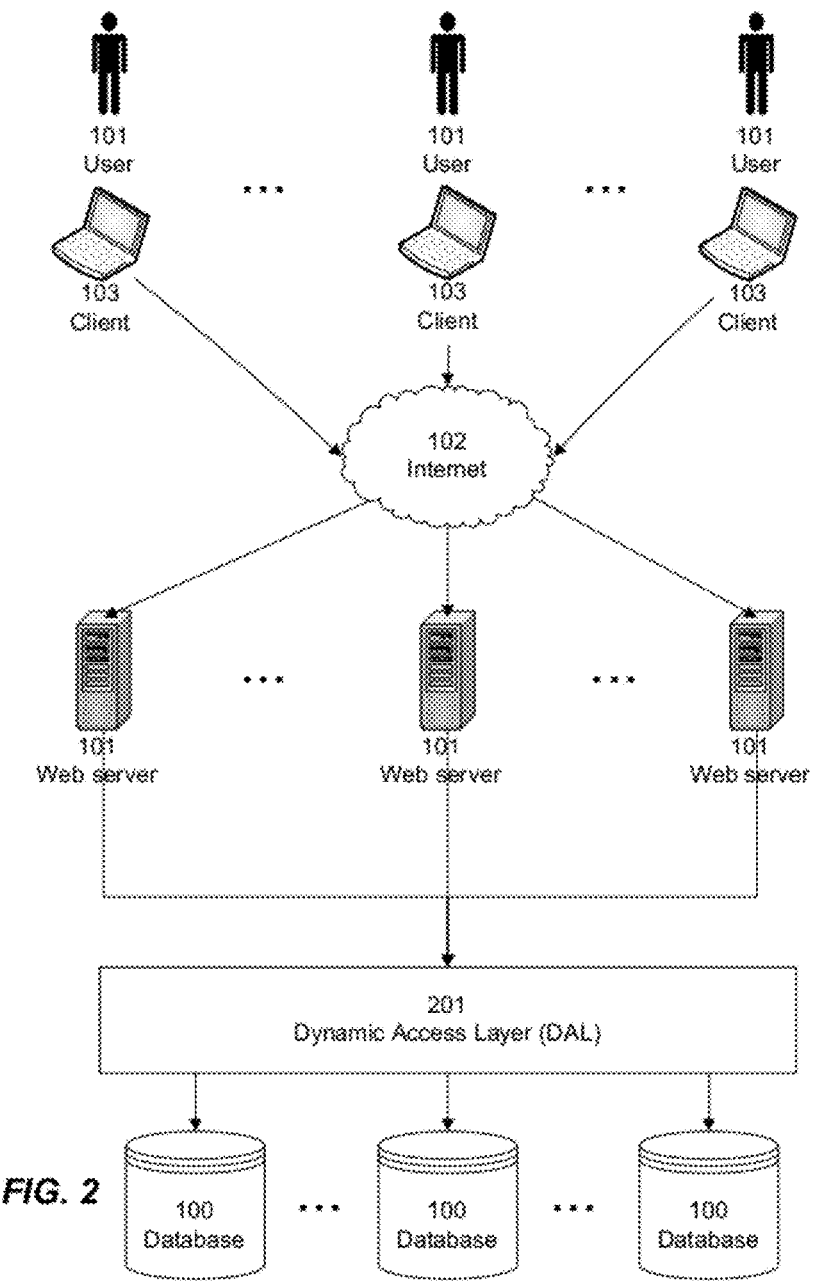
FIG. 2 is a block diagram depicting an example of an architecture wherein web servers communicate with databases via a data access layer, according one embodiment of the present invention.

Referring now to FIG. 2, there is shown a block diagram depicting an example of an architecture wherein web servers 101 communicate with any number of databases 100 via data access layer (DAL) 201, according one embodiment of the present invention. Such an arrangement improves scalability because additional databases 100 can be added without requiring reconfiguration of web servers 101. Data can be divided among databases 100 and/or moved as desired, without requiring substantial changes to application code running at web servers 101. DAL 201 constructs a logical database with which web servers 101 communicate, so that any changes to the underlying arrangements of physical databases 100 are essentially invisible to web servers 101.

In one embodiment, DAL 201 is implemented as a middle tier between applications running on web servers 101 and any number of databases 100. Databases 100 may store any type of data; for example, for e-commerce applications, databases 100 may include OMS (order management systems) data, inventory/catalog data, and/or the like. Such databases 100 can potentially reside on separate physical or logical servers as needed. As described in more detail below, DAL 201 provides a mechanism for abstracting the data access logic and implementation for databases 100, so that web servers 101 need not be aware of specific locations and/or arrangements of data on databases 100.

In one embodiment, DAL 201 allows standard operations to be performed on databases 100, including for example Create, Read, Update, and/or Delete. In one embodiment, DAL 201 acts as a JDBC (Java Database Connectivity) Proxy to perform such functions, but without changing the structure or type of data in this process. In one embodiment, DAL 201 provides a JDBC driver implementation as described in more detail below.

Figure 3A:
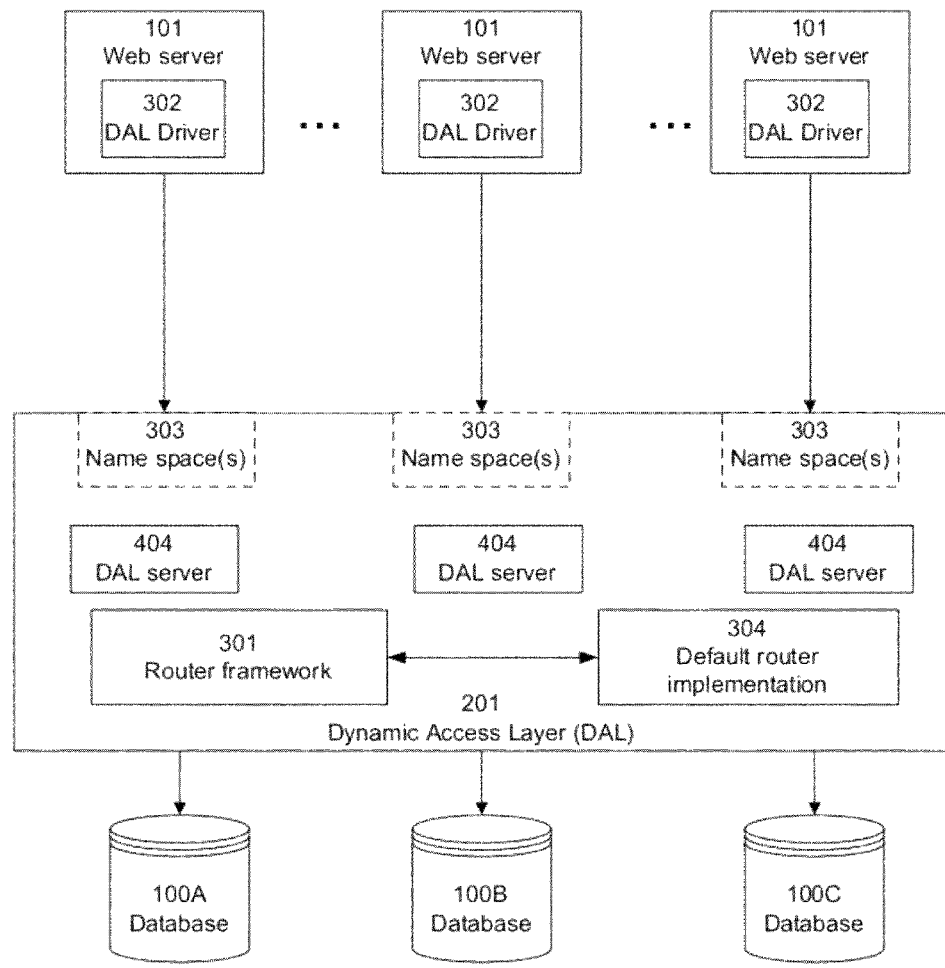
FIG. 3A is a block diagram depicting an example of an architecture wherein a data access layer includes a router framework for directing requests from web servers, according one embodiment of the present invention.

Referring now to FIG. 3A, there is shown a block diagram depicting an example of an architecture wherein DAL 201 operates as a logical intermediary between web servers 101 and a plurality of databases 100. DAL 201 includes a plurality of DAL servers 404 for generating one or more database construct(s) with which web servers 101 can connect. Web servers use DAL drivers 302 to request and establish connections with these logical database construct(s). DAL 201 also includes a router framework 301 for directing requests from web servers 101 to appropriate databases 100, according one embodiment of the present invention. Router framework 301 can direct requests according to current conditions and according to any appropriate routing algorithm. In one embodiment, router framework 301 can include a set of one or more routing rules, and allows applications running on web servers 101 to specify different types of routing algorithms as needed.

Connection requests from web servers 101 are routed to one or more databases 100, according to routing logic that may be specified according to name spaces and/or any other rules. Such connection routing is performed by DAL 201 in a manner that is transparent to web servers 101, so that web servers 101 only see the logical databases constructed by DAL 201 and do not need to concern themselves with physical databases 100.

In one embodiment, a client component, or DAL driver 302, is installed in each web server 101 to enable communication with DAL 201. In one embodiment, such drivers 302 conform to JDBC 2.0 specifications, so as to have minimal impact on web servers 101. Such JDBC-compliant DAL drivers 302 are able to function with any JDBC-compatible application running on web server 101 trying to access databases 100 directly.

In one embodiment, DAL 201 is implemented as a set of DAL servers 404 that present a logical (or virtual) database to web servers 101, and that run drivers for communicating with physical databases 100. The organization of this logical database is completely independent from the actual arrangement of physical databases 100. Applications running on web servers 101 use drivers 302 to open connections to DAL 201; for example, instead of using a URL associated with a physical database 100, the application uses a URL that identifies a host, port, and user associated with a logical database that is maintained at DAL 201. In response, DAL servers 404 open connections to physical databases 100 as needed, or pre-create the connections and arrange them in a connection pool in order to service requests from the applications.

DAL 201 is able to recycle connections between DAL servers 404 and physical databases 100, so that unused connections can be closed and made available again. Such an arrangement improves the efficiency of connection management, burst management, and peak load management, by optimizing the use of available connections and reducing or eliminating wasted connection bandwidth. Furthermore, the architecture of FIG. 3A allows any logical database to be constructed by DAL 201 and presented to web servers 101, regardless of the actual physical arrangement of databases 100. In essence, individual data elements of databases 100 can be mapped to any virtual data elements as desired, and such mapping can be completely transparent to web servers 101. In servicing a web server's 101 request, DAL 201 can obtain the needed data from any database 100 without web server 101 having to be concerned about where the data is coming from. Thus, data can be arranged and/or moved among databases 100 without having any effect on web servers 101.

For example, suppose each database 100 can support 2000 active connections. In a conventional non-DAL architecture such as shown in FIG. 1, each database 100 must make itself potentially available to each web server 101 in case a data connection request comes in from that web server 101. Thus, if there are 100 web servers 101, each web server 101 must be limited to 20 connections, so as not to exceed the overall limit of 2000 active connections should all web servers 101 request the maximum number of connections simultaneously. In such an architecture, addition of more servers 101 would cause the maximum number of active connections for each server 101 to decrease, so as to stay within the overall limit of 2000 active connections. This limitation on per-server connections can be very restrictive, and can reduce flexibility and performance even when overall system bandwidth is readily available.

The architecture of the present invention addresses such limitations of prior art systems. An overall limit of connections (such as 2000) to any particular physical database 100 can be enforced without imposing unduly restrictive limits on the number of connections each web server 101 can request. If needed, additional DAL servers 404 can be added to DAL 201 to handle higher numbers of connection requests from web server 101. Since web servers 101 connect with the logical database constructed by DAL servers 404, rather than directly with physical databases 100, the addition of DAL servers 404 increases the effective maximum number of connections for web servers 101, while avoiding exceeding the 2000 connection limit for each physical database 100. The available physical database 100 connections can thus be pooled, or multiplexed, as needed among DAL servers 404 so as to enable servicing of connection requests from web servers 101. Routing mechanisms and load balancing techniques can be used, as described in more detail below, so as to route connection requests to appropriate databases 100. Thus, the decoupling of connection request management allows for improved resource management, and in particular allows connections to be more easily pooled across the entire system.

Figure 3B:
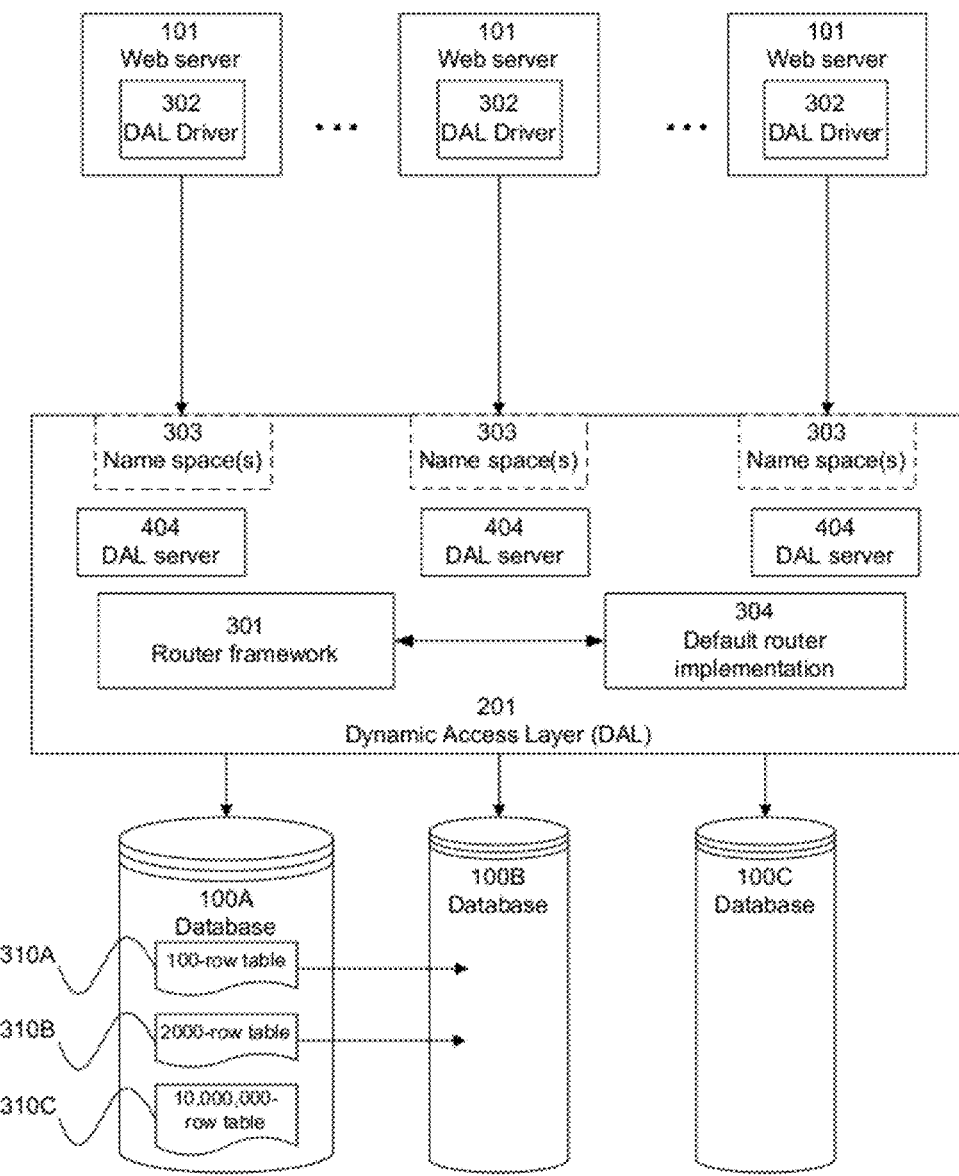
FIG. 3B is a block diagram depicting an example of movement of data tables in an architecture employing a data access layer, according one embodiment of the present invention.

In addition, as mentioned above, the architecture of the present invention allows data to be moved among databases 100 without requiring web servers 101 to make any changes or be aware of such movement of data. Referring now to FIG. 3B, there is shown an example of movement of data tables 310 in an architecture employing a data access layer 201, according one embodiment of the present invention. In the example, database 100A contains three tables 310A, 310B, 310C. Table 310A contains 100 rows of data, table 310B contains 2000 rows of data, and table 310C contains 10,000,000 rows of data. The presence of large table 310C can interfere with the performance of database 100A in servicing requests for content from tables 310A and 310B. In a conventional architecture such as depicted in FIG. 1, movement of data from one database 100 to another can be difficult because each web server 101 needs to know where to get each item of data from. Using the architecture of the present invention, however, tables 310A and 310B can easily be moved to another database, such as database 100B, so as to improve overall performance. Large table 310C can remain on database 100A so that it no longer interferes with the servicing of requests for data from tables 310A or 310B. Web servers 101 (and the applications running on them) need not make any changes to the way they request data, and need not be aware of which database 100 is servicing the requests, since DAL 201 handles the routing of the request to the appropriate database 100.

In one embodiment, DAL 201 maintains a default router logic implementation 304, implemented for example in XML (Extended Markup Language) format, to determine which database(s) 100 should be used to service a particular connection request.

Router framework 301 running on DAL 201 can be exposed to developers, so as to allow the developers to configure communications between DAL 201 and databases 100 as appropriate.

In one embodiment, router framework 301 contains a set of routing rules to determine which database(s) 100 should be used to service a particular connection request. These routing rules can be based on any number of factors, including for example the source of the request, the class of service, the time of day, the overall level of activity, the physical location of the data, and/or the like. In one embodiment, each request has a default target database 100; however, the routing rules may route the request to a database other than the default target database 100, as long as the request is routed to a database 100 that is able to service the request. In one embodiment, each database 100 exposes metadata about the services it supports, so that router framework 301 can leverage such information in performing routing operations.

When DAL 201 receives a request from a web server 101, it consults router framework 301 to determine whether a routing rule has been established. If so, the routing rule is evaluated, and a connection is established with the appropriate database(s) 100. Again, DAL 201 handles such routing, so that applications running on web servers 101 need not be concerned with which physical databases 100 are servicing their requests.

Router framework 301 can be based on a filter pattern, such as, for example, a regular expression test and match. In one embodiment, router framework 301 employs a plurality of definitions that can be applied one after another to perform routing operations.

Router framework 301 can support any type of router functionality, such as, for example:
- File: Read properties from a property file and plug-in to router framework 301
- DB: Read properties from the database and plug-in to router framework 301
- URL: Read properties from the URL (e.g. web service, or feed) and plug-in to router framework 301; such properties can be specified in any known format, such as key/value pairs, XML, or the like In one embodiment, data/properties are dynamically updated based on a refresh interval property.

Any number of routers can be based on router framework 301, and the routers can be enabled and/or disabled as needed. If a given router is disabled, DAL 201 forwards the request to the next router in the configuration.

In one embodiment, applications running on web servers 101 can plug in their own routing algorithms.

In one embodiment, the various logical databases implemented by DAL servers 404 are each associated with a particular physical database 100. Thus, a default target database 100 can be identified for each incoming query. Thus, data is distributed among databases 100 according to name spaces 303 that define default routing that can be overridden by routing rules. Such name spaces 303 can be virtualized, and can be defined according to any known definition paradigm. For example, each database 100 can be associated with a host name, port, and instance ID, with the instance IDs corresponding to name spaces 303. In one embodiment, when DAL 201 receives a request from a web server 101, if no routing rule can be found, DAL 201 routes the request to database 100 associated with the name space of the data request. In one embodiment, before routing a request to a database 100, the system of the present invention validates that the requisite underlying data structures (such as tables, views, and/or stored procedures) are present in the target database 100.

Name spaces 303 can thus provide default mappings to particular databases 100, while allowing for specification of rules that override these defaults. In this manner, the architecture depicted in FIG. 3A provides a great deal of flexibility in establishing rules and default settings for routing requests to databases 100.

As described above, routing rules can be specified in default router implementation 304 using XML or any other known language. These rules can be implemented as an API and can be exposed so that developers can configure them as desired. In one embodiment, router framework 301 can include any number of routers. For example, router framework 301 can include a chain of routers that implement different sets of rules. If a particular router cannot resolve a request, it can pass the request to the next router in the chain. In one embodiment, a router can be configured to break the chain and not look at any further routers once a request has been resolved.

The architecture of FIG. 3A thus provides a way to multiplex connections with databases 100 and thereby improve the efficiency with which system resources are used. Data can be easily moved from one database to another 100, and new databases 100 can be added, while logical databases maintained by DAL servers 404 can remain unaffected. Conversely, additional connections can be made available by adding DAL servers 404, without requiring changes to underlying physical databases 100 and without requiring extensive system reconfiguration. Furthermore, legacy applications running on web servers 101 can continue to operate even if the underlying data structure changes. In addition, the system of the present invention provides improved horizontal scaling across a cluster of databases 100, potentially reduces the total number of connections needed, and provides improved handling of sudden changes in demand for connections.

For example, in an implementation having 500 web servers 101 attempting to connect to a database 100 that has a maximum of 2000 available connections, each web server 101 would have a maximum of four connections at a time, according to prior art methods. If, as described herein, 50 DAL servers 404 were used as intermediaries between web servers 101 and database 100, then each DAL server 404 would have a pool size of 40 connections (since the total available connections remains 2000). If each DAL server 404 allows eight connections from web servers 101, such an arrangement would permit 8×500=4000 connections into DAL servers 404, with only 2000 connections from DAL servers 404 to database 100. In essence, as long as all web servers 101 are not all using their maximum number of connections at the same time, such an architecture allows connections to be pooled so as to avoid the fixed limit of four connections for each web server 101.

In one embodiment, PL/SQL code running on databases 100 can continue to function as normal. No changes need be made in such code in order to implement the DAL-based architecture shown in FIG. 3A.

Figure 4:
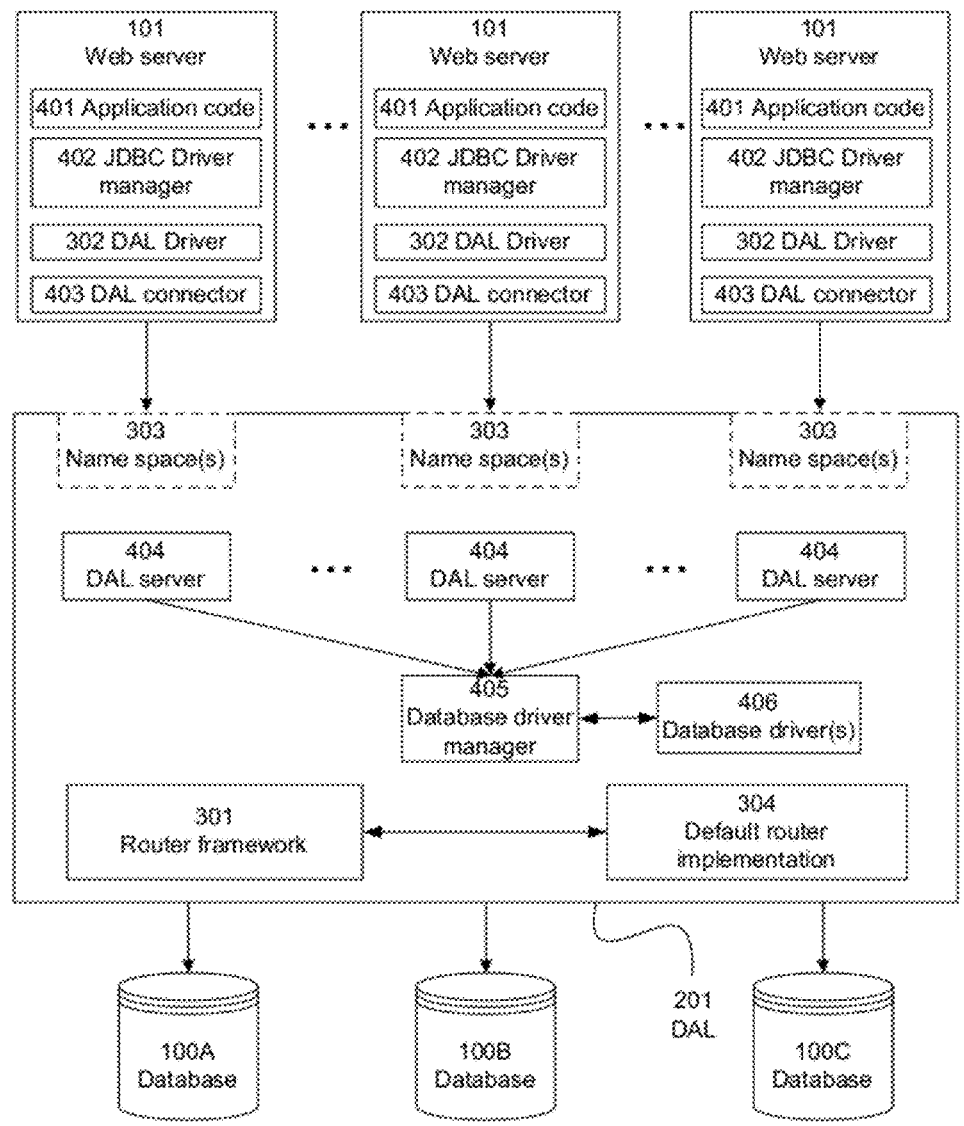
FIG. 4 is a block diagram depicting a more detailed example of an architecture for implementing the present invention according to one embodiment.

Referring now to FIG. 4, there is shown a more detailed example of an architecture for implementing the present invention according to one embodiment. Each web server 101 includes application code 401. JDBC driver manager 402, DAL driver 302, and DAL connector 403 are software components that can be dynamically loaded and/or initiated on web server 101. Any or all of such components can be implemented as software running on web server 101, or on an application server (not shown) or other component. As will be apparent to one skilled in the art, these software components can also be distributed among a plurality of hardware components that may be local or remote with respect to one another.

Application code 401 runs a web-based application for receiving input from a user and presenting output to the user. JDBC driver manager 402 provides DAL driver 302 when needed, so as to enable communication between web server 101 and DAL 201. DAL connector 403 is a software component running on server 101, for initiating and implementing the connection between web server 101 and DAL 201.

DAL 201 includes any number of DAL server(s) 404 for performing the connection management and routing functions described herein. In one embodiment, DAL server(s) 404 are implemented as high-performance multi-threaded TCP servers that establish logical database constructs and that interact with drivers 406 to make calls to physical databases 100. In one embodiment, DAL server(s) 404 listen on a specific port, read requests from application code 401 running on web servers 101, establish connections with appropriate database(s) 100 to service such requests, get query results, and send responses back (as a result set) to application code 401 running on web servers 101. DAL server(s) 404 may also post-operatively or preemptively cache DAL requests and their results. In one embodiment, DAL server(s) 404 are able to provide a detailed monitoring and alerting mechanism for administration and performance analysis purposes. In one embodiment, DAL server(s) 404 support programmatic transactions and/or XA transactions (according to the XA transaction standard developed by The Open Group for distributed transaction processing).

An example of an XA transaction according to one embodiment is as follows:

```
public void updateCustomerOrder(OrderData) throws
  Exception {
  UserTransaction txn=context.getUserTransaction( );
    try {
      OrderDAO dao=new OrderDA( );
      dao.updateOrder(OrderData);
      txn.commit( )
    }catch (Exception exp){
      txn.rollback( );
      throw exp;
    }
}
```

In one embodiment, DAL server(s) 404 interface with router framework 301 to enable connection request routing. In one embodiment, DAL 201 also includes database driver manager 405 which provides drivers 406 to DAL servers 404 for establishing connections with physical databases 100 as needed. If needed, such drivers 406 can be specialized and/or configurable to operate with particular types of databases 100. For example, an Oracle driver 406 may be made available for connection to Oracle databases 100. In one embodiment, database driver manager 405 and database driver 406 are software components that can be dynamically loaded and/or initiated on DAL server(s) 404. In one embodiment, these components can also fall back to web server(s) 101 in case of a system issue or problem on DAL server(s) 404. Also, in one embodiment, DAL 201 includes a light-weight framework that supplies a recommended approach for future data-access code development.

In one embodiment, DAL 201 defines a connection group (or type), which is defined as a pool of database 100 connections that can be shared among applications running on web servers 101. Each such connection group can have one or more database 100 connections; as described herein, various routing mechanisms can be used for allocating such connections. When application code 401 running on a web server 101 requests a connection to a specific database group or type, DAL 201 forwards the request to routing framework 301, which determines how the request should be handled and routed, and returns the connection pool information to a DAL server 404. DAL server 404 then uses a database connection from the appropriate connection pool to execute the request and send the results back to application code 401.

Any or all of the DAL components shown in FIG. 4 can be implemented as software running on or in connection with DAL server(s) 404. As will be apparent to one skilled in the art, these software components can also be distributed among a plurality of hardware components that may be local or remote with respect to one another.

Method of Operation

Figure 5:
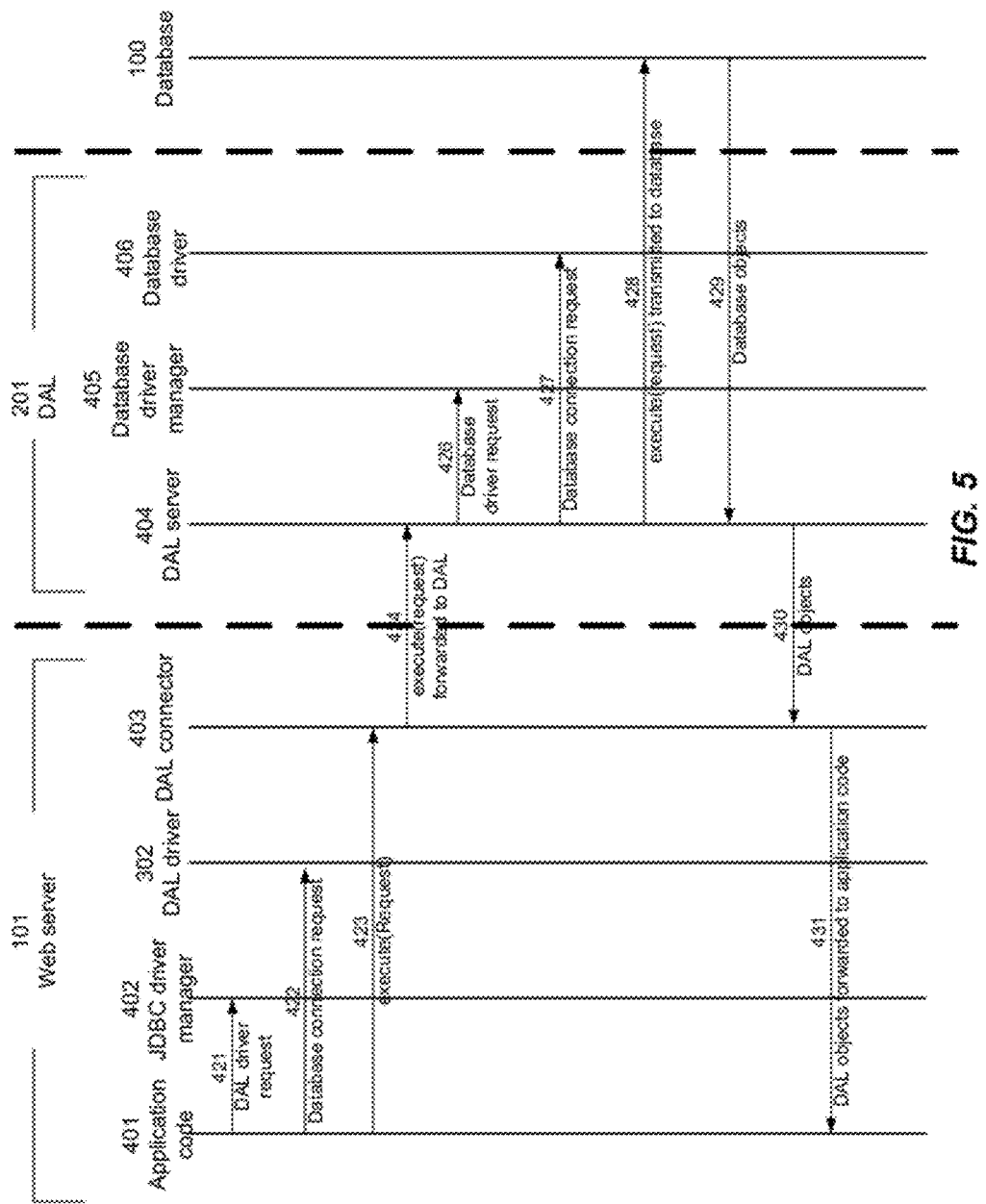
FIG. 5 is an event trace diagram depicting a method of operation of the present invention, according one embodiment.

Referring now to FIG. 5, there is shown an event trace diagram depicting a method of operation of the present invention, according one embodiment. One skilled in the art will recognize that the depicted method is exemplary, and that the techniques of the present invention can be implemented in other ways. In addition, the particular sequence of steps depicted and described are merely exemplary.

The method depicted in FIG. 5 shows a sequence of steps performed by various entities in handling a request to connect to a database, for example for performing a data transaction. In one embodiment, the entities are arranged as described above in connection with FIGS. 3A and 4. For illustrative purposes, FIG. 5 depicts the method in the context of a single web server 101, a single DAL server 404, and a single database 100. However, any number of web servers 101, DAL servers 404, and databases 100 can be provided. As described above, in one embodiment each web server 101 includes application code 401, JDBC driver manager 402, DAL driver 302, and DAL connector 403; also, as described above, in one embodiment each DAL server 404 includes database driver manager 405 and database driver 406.

Application code 401 running on web server 101 requests 421 a DAL driver 302 from JDBC driver manager 402. In one embodiment, this request specifies a connection string or URL, such as for example "host:port:instance". As described above, in one embodiment JDBC driver manager 402 is a JDBC spec driver manager that is able to provide DAL drivers 302 in response to such requests. Once JDBC driver manager 402 has provided DAL driver 302, application code 401 requests 422 a connection to a database, for example by sending a getConnection request to DAL driver 302. This command initiates the process of establishing a connection to a logical database provided by DAL 201.

In one embodiment, application code 401 sends the get-Connection request to a DAL connection pool, which initiates a connection( )method to obtain a connection from a WMConnection method running at DAL driver 302. This sequence generates a connection that is then returned to application code 401.

In one embodiment, the connection to the logical database is established by a DAL connector 403 software component, which may be implemented as a standard Java SQL object. Application code 401 sends 423 an execute(Request) command (wherein the request can be for any data transaction) to DAL connector 403, and DAL connector 403 transmits 424 the specified request to DAL 201 for execution at DAL server 404. In one embodiment, this is performed by sending a create CallableStatement message from application code 401 to a WMStatement method running at DAL driver 302. The WMStatement method performs the steps involved in creating a callable statement for accessing DAL 201. Application code 401 then sends the execute(Request) method to cause WMStatement to forward the request to DAL 201.

In one embodiment, router framework 301 determines which physical database 100 will be used for handling the request. DAL server 404 requests 426 a database driver 406 from database driver manager 405, for example by sending a getDriver command to driver manager 405. DAL server 404 then requests 427 a connection to the selected physical database 100 via database driver 406, for example by sending a getConnection command to database driver 406. DAL server 404 then forwards 428 the execute(Request) command to the physical database 100 to perform the requested data transaction. In one embodiment, prior to forwarding the request, DAL server 404 converts the request to a format compatible with the connection to the physical database 100.

Database 100 responds to the execute(Request) command by performing the requested data transaction, generating a result set. The result set can take the form of database objects 429 such as Oracle objects, which are then provided to DAL server 404. In one embodiment, DAL server 404 converts these objects to an object format (a "DAL object format") corresponding to the logical database layout expected by application code 401. DAL server 404 then forwards 430 these DAL objects to DAL connector 403, which in turn forwards 431 them to application code 401.

An example of a command that can be forwarded to physical database 100 according to the above method is an API_READ( ) command. Such a command would be forwarded, for example, to a Database[READ] component of database 100. In response, database 100 provides a result set, such as a set of database objects 429, to be converted and returned to application code 401.

Another example of a command that can be forwarded to physical database 100 according to the above method is an API_RW( ) command. Such a command would be forwarded, for example, to a Database[RW] component of database 100. In response, database 100 provides a result set, such as a set of database objects 429, to be converted and returned to application code 401.

In one embodiment, the database objects in their native form (such as Oracle objects) and the converted objects in the DAL object format both implement a Java SQL result set. In this manner, the same interface is presented to web servers 101 as would be presented if web servers 101 were directly connecting to databases 100. In one embodiment, this is accomplished by DAL 201 obtaining the result set from database 100, and converting that result set into a DAL result set before sending it to web servers 101.

In one embodiment, a connection can be closed, for example in response to a message from application code 401. For example, application code 401 may issue a comment( )/rollback( ) message to DAL server 404. DAL server 404 forwards the message to appropriate components of database(s) 100. In response to a close( ) message from application code 404, DAL connector 403 returns the connection to the pool for later use. Similarly, in response to a close( ) message from DAL driver 302, DAL server 404 returns the connection to the pool as well.

Figure 6:
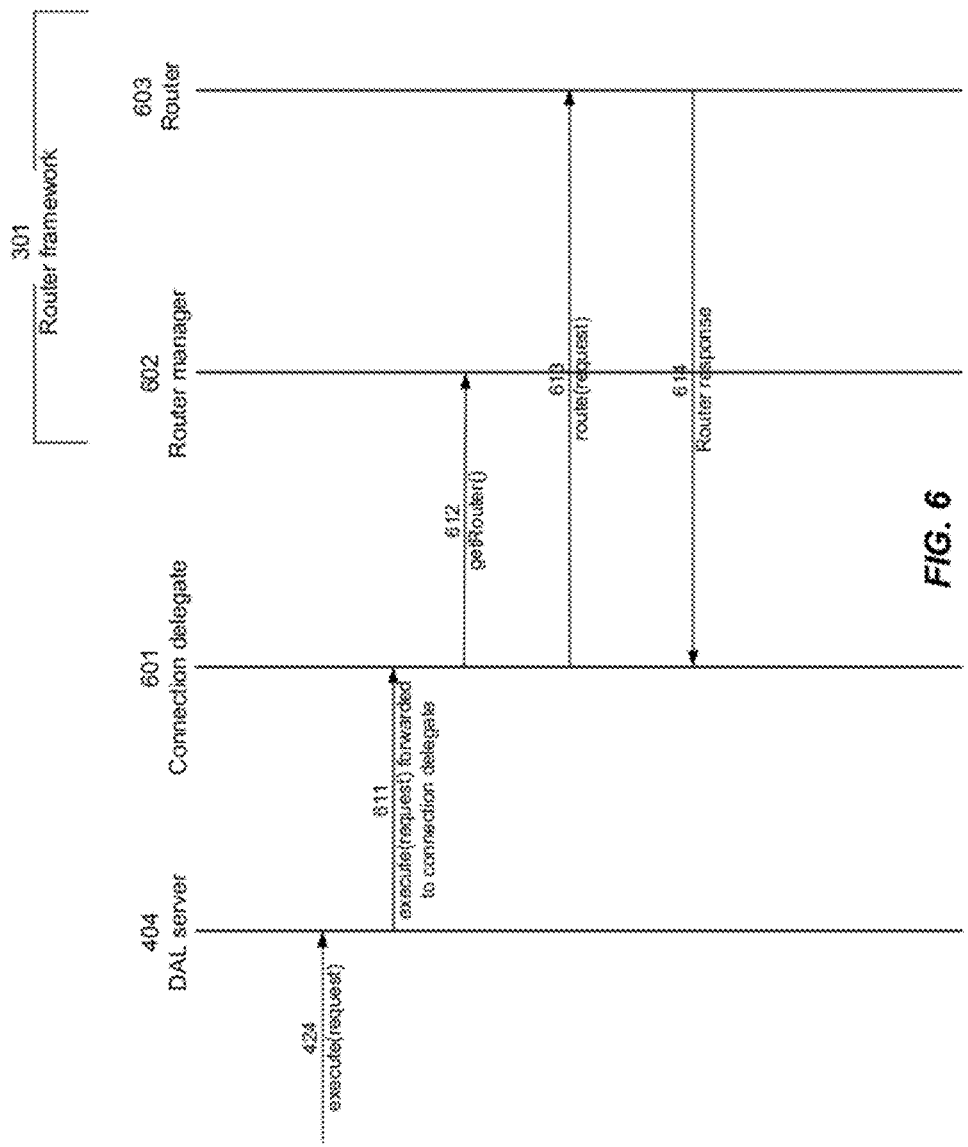
FIG. 6 is an event trace diagram depicting a method of operation of a router framework of the present invention, according one embodiment.

Referring now to FIG. 6, there is shown an event trace diagram depicting a method of operation of router framework 301 of the present invention, according one embodiment. As described above, router framework 301 determines which physical database 100 should be selected to handle a particular data request.

Upon receiving the execute(Request) command 424, DAL server 404 passes 611 the request to a connection delegate 601, which manages incoming DAL requests. Connection delegate 601 requests 612 a list of available routers from router manager 602, for example by sending a getRouter( ) request. In one embodiment, a default router can be specified, for example using an XML specification, to be used if no other routers are available. In one embodiment, routers are maintained in an ordered list, and are called in sequence unless a given router returns an exit code.

Once a router 603 has been selected (either a default router or one selected from the list obtained from router manager 602), connection delegate 601 sends 613 a command to selected router 603 to request information about which database 100 DAL server 404 should connect to. This command may be, for example, a route(request) command transmitted from connection delegate 601 to router 603. The "request" parameter may be the actual request that was received from application code 401, or it may be a wrapper containing metadata that describes the request, or it may be a combination of the request itself and metadata describing it. In one embodiment, router 603 makes the determination as to which database 100 should be used by analyzing the request itself; in another embodiment, router 603 uses metadata it receives from connection delegate 601 in making the determination.

Router 603 responds 614 to the route(request) command by identifying a database 100 to be used. Response 614 can also indicate whether processing (routing) should continue with other routers 603, or whether the routing chain should stop. In one embodiment, a routing chain is established so that the routing rules can be broken up into logical and manageable units. Once connection delegate 601 receives the selection of a database 100, it proceeds with obtaining drivers and connections as described above in connection with steps 426 and 427 of FIG. 5.

In one embodiment, once a database 100 has been selected, the same database 100 may be used for multiple calls, so as to maintain integrity of a single session. In one embodiment, the degree to which a router selection should be considered "sticky", or persistent, can be specified in the router request metadata. Parameters or conditions under which new database 100 selection should take place can be specified.

Figure 7A:
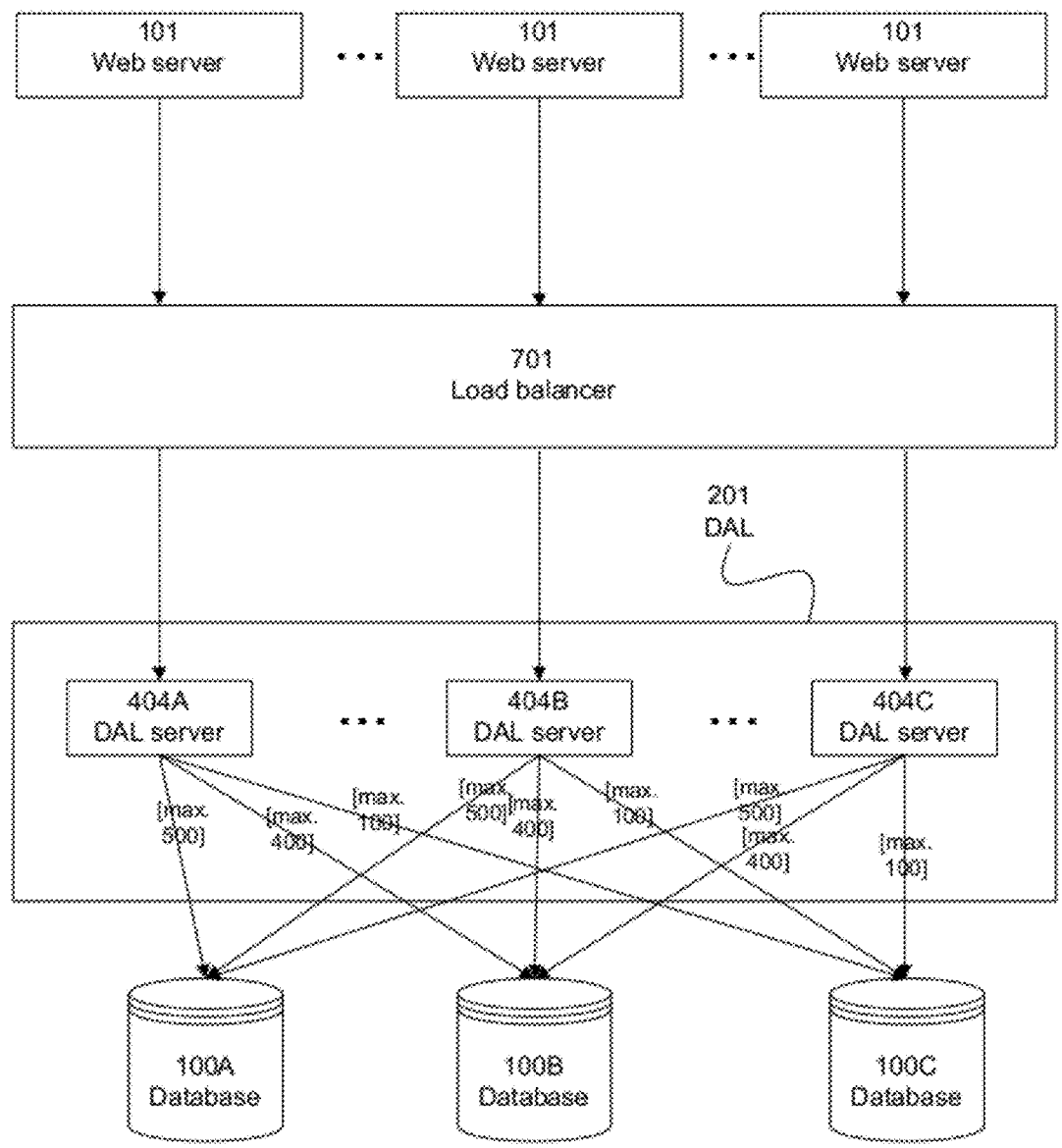
FIGS. 7A and 7B are a set of block diagrams depicting an example of an architecture wherein a load balancer directs requests among a plurality of data access layer servers, according one embodiment of the present invention.
Figure 7B:
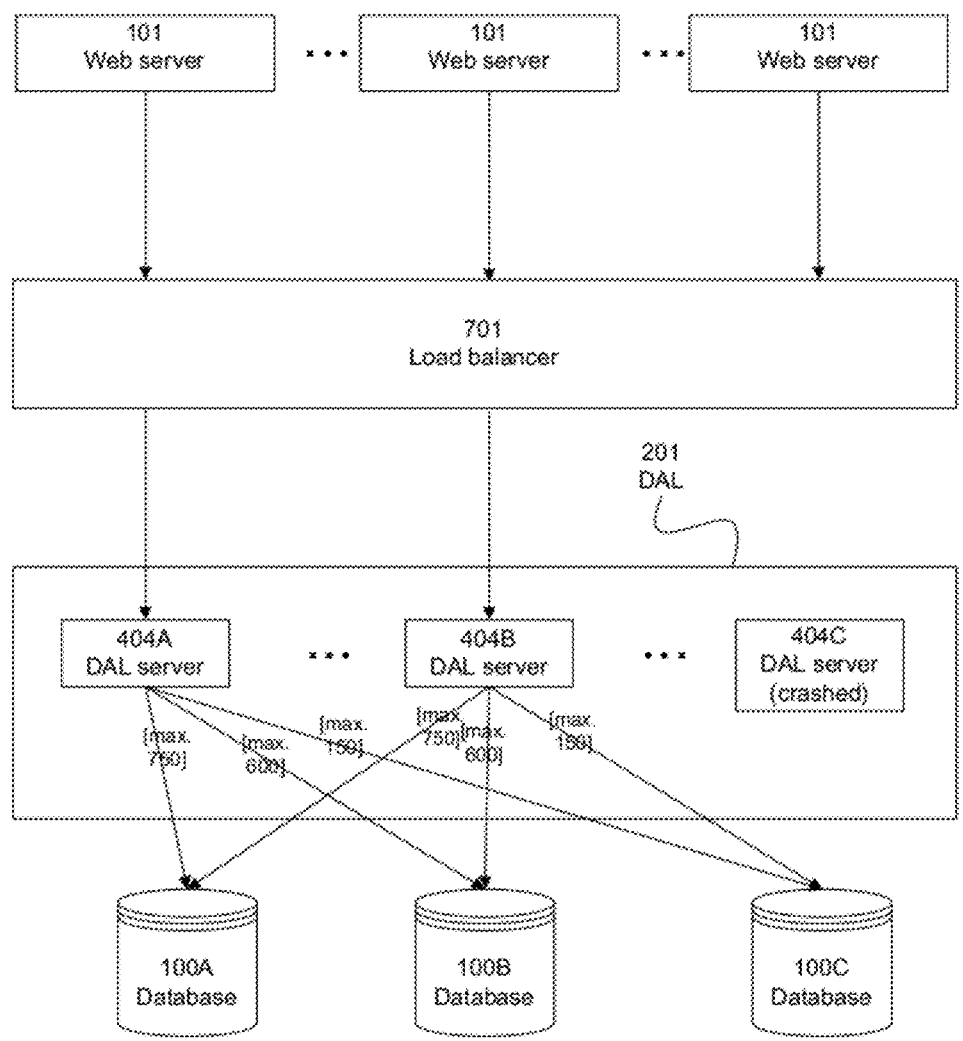

In one embodiment, the system of the present invention implements a load balancer to select one of a plurality of DAL servers 404 for handling a request. Referring now to FIGS. 7A and 7B, there is shown a set of block diagrams depicting an example of an architecture wherein a load balancer 701 directs requests among a plurality of DAL servers 404A, 404B, 404C, according one embodiment of the present invention. Load balancer 701 may be, for example, a NetScaler 9800, although one skilled in the art will recognize that any suitable load balancer can be used. In one embodiment, load balancer 701 provides support of at least 2000 active connections to DAL servers 404, and is able to keep active connections alive for up to 24 hours.

Application code 401 running on web server 101 requests data by pointing to a host name associated with load balancer 701. Load balancer 701 directs requests among a plurality of DAL servers 404A, 404B, 404C using load balancing techniques that take into account factors such as geographical proximity, current load conditions, crashes, and the like. Each DAL server 404 services requests it receives by connecting to appropriate databases 100A, 100B, 100C as described above.

Load balancer 701 allows the system of the present invention to adapt to changing conditions and to route requests appropriately. For example, in FIG. 7A, suppose each of three DAL servers 404A, 404B, 404C can normally support 500 connections to database 100A, 400 connections to database 100B, and 100 connections to database 100C; in the diagram, these limits are shown in square brackets for each DAL server-database pair. Thus, there are a total of 1500 available connections to database 100A, 1200 connections to database 100B, and 300 connections to database 100C. If, as shown in FIG. 7B, one of the DAL servers 404 (such as DAL server 404C) crashes or otherwise becomes unavailable, the total number of available connections to databases 100A, 100B, and 100C would drop. For example, instead of 1500 available connections to database 100A, there would only be 1000 available connections (500 from each remaining DAL server 404A, 404B). According to the techniques of the present invention, remaining DAL servers 404A, 404B query load balancer 701 so that they are aware of how many servers 404 are currently operating. In response, DAL servers 404A, 404B can increase their connection maxima in order to compensate for the loss of server 404C. Thus, as shown the example of FIG. 7B, servers 404A, 404B can increase their connection maxima by a factor of 1.5 to reestablish the same overall connection maxima as before. Alternatively, the total number of connections that are to be made available can be divided equally among currently functioning DAL servers 404, and such calculations can be updated in real time so as to respond to changing conditions. DAL servers 404A, 404B continue to query load balancer 701 so that they are made aware when DAL server 404C returns to operation, and can restore their original maximum levels as appropriate.

In one embodiment, as described above, load balancer 701 maintains information as to which DAL servers 404 are currently operational, and DAL servers 404 query load balancer 701 when such information is needed. In another embodiment, DAL servers 404 can communicate directly with one another so that they know which DAL servers 404 are currently functioning and can make adjustments accordingly.

For example, load balancer 701 can monitor current status of a DAL server 404 by opening and closing a connection to the TCP port of the DAL server 404. In this manner, load balancer 701 is able to check the TCP port availability and detect issues that may have impacted DAL server 404. In addition, when load balancer 701 becomes away that a DAL server 404 has been removed from rotation or has crashed, in one embodiment load balancer 701 sends a reset message, functionally similar to a TCP RST (reset) message to client 103 and web server 101 so that a new connection can be initiated.

In one embodiment, DAL 201 is configured as a TCP service in proxy mode. Requests to DAL servers 404 are made by load balancer 701.

In one embodiment, there no persistence of source IP from one request to another; each new connection request is load balanced separately as described above. In another embodiment, persistence or "stickiness" can be implemented as appropriate or desired.

In one embodiment, load balancer 701 uses a "least connection" algorithm to decide which DAL server 404 should receive a request; under this algorithm, the load balancer 701 currently having the fewest connections is selected. One skilled in the art will recognize that other algorithms can be used.

Components and Libraries

In one embodiment, the system of the present invention is implemented as software running on various components that are in communication with one another. In one embodiment, the following software components and/or libraries are provided:

DAL driver(s) 302: In one embodiment, these are JDBC-compliant drivers usable by application code 401 to interface with DAL 201;

DAL-DO/DAO: Interface and Abstract class for writing custom DO (data objects) or DAO (data access objects) code DAL router framework 301: a routing framework that provides default common routing algorithms with the ability to specify further parameters/rules DAL server(s) 404: In one embodiment, these are implemented as high-performance multi-threaded TCP servers that listen on a specific port, read client request(s), routes such requests to the appropriate database 100 to get query results, and send responses back (as a result set) to applications running on web servers 101

Sample DAL Server Workflow

The following is an example of DAL server 404 workflow for implementing the present invention according to one embodiment.

As described above, in one embodiment, each DAL server 404 supports multiple connection groups (or types). For example, one connection group may be associated with a catalog database, while another connection group may be associated with an order management system (OMS). In one embodiment, each connection group can have different properties associated with it. Examples of properties that can be associated with a connection group include:

Name (e.g., "Catalog")

Default connection pool (e.g., jdbcpool_catalog)

Is enabled (specifies whether the connection group is enabled or disabled

Router list (a list of router(s) associated with the connection group)

In one embodiment, each connection group can also have different type(s) of routing filter logic associated with it. For example, a router list might be specified including:

ServerBasedRoutingFilter

Router Name (e.g., "Server Name based router")

Is enabled (specifies whether the routing logic is enabled or disabled)

Router Type (e.g., DB/File/URL, as described above)

Router Property (e.g., property file for "File"-based router type)

Refresh Interval (e.g., 5 minutes, 10 minutes, or the like)

APIBasedRoutingFilter

ParameterBasedRoutingFilter

When application code 401 running on web server 101 makes a request for data (e.g. when execute( ) execute Update( ) or executeQuery( ) is called), the request passes through an ordered sequence of routing filters. These routing filters have access to the actual request as well as to a DAL session which is tied to a given DAL connection.

The routing filters then parse the request (based on their attributes) and deduce the connection pool to be used for connecting to the backend database 100. If the filters are unable to decide based on available data, a default connection pool is used for the query execution.

Upon execution, DAL 405 obtains the native ResultSet, extracts it into a DAL ResultSet, and passes it back to the calling application code 401. In one embodiment, DAL 405 honors parameters such as the JDBC fetch-size parameter, so as to limit the amount of data being sent to application code 401.

In one embodiment, DAL 405 can leave the connection to database 100 open until the calling application code 401 explicitly closes the connection. Alternatively, DAL 405 can automatically expire the connection lease time and force-close the connection after some period of time or inactivity, or in response to some other condition or trigger event.

Sample Configuration File Structure

The following is an example of a configuration file according to one embodiment. The configuration file of the following example defines connection type (group), associated router types, and other properties. One skilled in the art will recognize that the configuration file can take other forms.

```
<beans>
   <bean id="catalog_connectiontype"
class="com.wm....ConnectionType">
      <property name="name" value="catalog"/>
      <property name="defaultConnection"
value="jdbcpool_catalog"/>
      <property name="isEnabled" value="true"/>
      <property name="routerList">
        <list>
           <ref bean="NameBasedRouter"/>
           <ref bean="APIBasedRouter"/>
        </list>
      </property>
   </bean>
   <bean id="NameBasedRouter"
         class="com.wm.dal.router.NameBasedRouter"
         singleton="false" OR scope="prototype">
      <property name="name" value="Name Based Router"/>
      <property name="isEnabled" value="true"/>
      <property name="routerType" value="FILE"/>
      <property name="routerPropertyFile"
value="/export/home/web/namebased.properties"/>
      <property name="refreshInterval" value="10"/>
   </bean>
   <bean id="APIBasedRouter"
         class="com.wm.dal.router.APIBasedRouter"
         singleton="false" OR scope="prototype">
      <property name="name" value="API Based Router"/>
      <property name="isEnabled" value="true"/>
      <property name="routerType" value="DB"/>
      <property name="refreshInterval" value="30"/>
   </bean>
</beans>
```

In various embodiments, the present invention can be implemented as a system or a method for performing the above-described techniques, either singly or in any combination. In another embodiment, the present invention can be implemented as a computer program product comprising a computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared, transformed, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be down-loaded to reside on and be operated from different platforms used by a variety of operating systems.

The present invention also relates to an apparatus for performing the operations herein. This apparatus may be specially constructed for the required purposes, or it may comprise one or more general-purpose computer(s) selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and/or other electronic devices referred to in the specification may include a single processor or may be architectures employing multiple processor designs for increased computing capability. In one embodiment, some or all of the functional components described above are implemented as computer hardware including processors performing the above-described steps under the control of software.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Accordingly, in various embodiments, the present invention can be implemented as software, hardware, or other elements for controlling a computer system, computing device, or other electronic device, or client/server architecture, or any combination or plurality thereof. Hardware for implementing the system of the present invention can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention (or components of the invention) include: a mobile phone, personal digital assistant, smartphone, kiosk, desktop computer, laptop computer, consumer electronic device, television, set-top box, or the like. An electronic device for implementing the present invention may use an operating system such as, for example, Microsoft Windows Vista available from Microsoft Corporation of Redmond, Wash., or any other operating system that is adapted for use on the device.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A computer-implemented method for performing a data transaction with respect to data stored in a plurality of databases, comprising:
    at a data access layer comprising a plurality of DAL servers, performing the steps of:
        establishing a plurality of logical database constructs, each of the plurality of logical database constructs having default routing to one of the plurality of physical databases as a default physical database, such default routing specifying a default physical database as a default destination for forwarding a data transaction request received at the logical database construct;
        receiving a database connection request from a web server;
        establishing a connection between the web server and a logical database construct based on the contents of the database connection request;
        receiving a data transaction request from the web server on the database connection between the web server and the logical database construct;
        redirecting the data transaction request from the default physical database for the logical database construct to another physical database, the data transaction request being redirected based on routing rules that override the default routing for the logical database construct;
        establishing a database connection with the other physical database;
        transmitting the data transaction request to the other physical database;
        receiving a result set from the other physical database; and
        returning the result set to the web server.

2. The computer-implemented method of claim 1, further comprising, responsive to receiving the data transaction request from the web server:
    at a load balancer, selecting a DAL server to receive the database connection request from a web server; and
    routing the database connection request to the selected DAL server;
    and wherein the steps of establishing the database connection, transmitting the data transaction request, receiving the result set, and returning the result set are performed by the selected DAL server.

3. The computer-implemented method of claim 1, further comprising, at the data access layer, converting the data transaction request to a format compatible with the database connection with to the other physical database.

4. The computer-implemented method of claim 1, wherein the result set comprises at least one database object.

5. The computer-implemented method of claim 4, further comprising, prior to returning the result set to the web server, converting the at least one database object to a format compatible with the database connection between the web server and the logical database construct.

6. The computer-implemented method of claim 1, wherein receiving a database connection request from a web server comprises receiving a database connection directed to at least one of the established logical database constructs.

7. The computer-implemented method of claim 1, wherein:
    establishing a connection between the web server and the logical database construct comprises:
        receiving a request for a DAL driver;
        providing the DAL driver; and
        using the DAL driver to establish the connection between the web server and the logical database construct;
    and wherein:
    establishing a database connection with the other physical database comprises:
        issuing a request for a database driver;
        obtaining the database driver; and
        using the database driver to establish the database connection with the other physical database.

8. The computer-implemented method of claim 1, further comprising, prior to redirecting the data transaction request, at the data access layer:
    consulting a router to select the other physical database for handling the data transaction request.

9. The computer-implemented method of claim 8, wherein consulting a router comprises initializing a routing framework for implementing at least one routing rule.

10. The computer-implemented method of claim 8, wherein consulting a router comprises initializing a routing framework for implementing a plurality of routing rules and at least one default routing rule.

11. The computer-implemented method of claim 1, further comprising:
    establishing a pool of available connections between a set of web servers and a set of logical database constructs; and
    establishing a pool of available connections for a set of the plurality of physical databases.

12. The computer-implemented method of claim 11, wherein:
    establishing a connection between the web server and a logical database construct comprises obtaining a connection from a connection pool; and
    establishing a database connection with at least one the other physical database comprises obtaining a connection from a connection pool.

13. The computer-implemented method of claim 11, further comprising:
responsive to unavailability of the other physical database, moving at least one available connection from the other physical database to other a further physical database selected from among the plurality of physical databases.

14. A computer program product for performing a data transaction with respect to data stored in a plurality of databases, comprising:
a computer-readable storage medium; and
computer program code, encoded on the storage medium, for causing at least one processor operating at a data access layer comprising a plurality of DAL servers to perform the steps of:
establishing a plurality of logical database constructs, each of the plurality of logical database constructs having default routing to one of the plurality of physical databases as a default physical database, such default routing specifying a default physical database as a default destination for forwarding a data transaction request received at the logical database construct;
receiving a database connection request from a web server;
establishing a connection between the web server and a logical database construct based on the contents of the database connection request;
receiving a data transaction request from the web server on the database connection between the web server and the logical database construct;
redirecting the data transaction request from the default physical database for the logical database construct to another physical database, the data transaction request being redirected based on routing rules that override the default routing for the logical database construct;
establishing a database connection with the other physical database;
transmitting the data transaction request to the other physical database;
receiving a result set from the other physical database; and returning the result set to the web server.

15. The computer program product of claim 14, further comprising computer program code for, responsive to receiving the data transaction request from the web server:
causing at least one processor operating at a load balancer to perform the steps of:
select a DAL server to receive the database connection request from a web server; and
routing the database connection request to the selected DAL server;
and wherein the steps of establishing the database connection, transmitting the data transaction request, receiving the result set, and returning the result set are performed by at least one processor operating at the selected DAL server.

16. The computer program product of claim 14, further comprising computer program code for causing at least one processor operating at the data access layer to convert the data transaction request to a format compatible with the database connection to the other physical database.

17. The computer program product of claim 14, wherein the result set comprises at least one database object.

18. The computer program product of claim 17, further comprising computer program code for, causing the at least one processor operating at a data access layer to, prior to returning the result set to the web server, convert the at least one database object to a format compatible with the database connection between the web server and the logical database construct.

19. The computer program product of claim 14, wherein the computer program code for causing at least one processor to receive a database connection request from a web server comprises computer program code for causing at least one processor to receive a database connection directed to at least one of the established logical database constructs.

20. The computer program product of claim 14, wherein:
the computer program code for causing at least one processor to establish a connection between the web server and the logical database construct comprises computer program code for causing at least one processor to perform the steps of:
receiving a request for a DAL driver;
providing the DAL driver; and
using the DAL driver to establish the connection between the web server and the logical database construct;
and wherein:
the computer program code for causing at least one processor to establish a database connection with the other physical database comprises computer program code for causing at least one processor to perform the steps of:
issuing a request for a database driver;
obtaining the database driver; and
using the database driver to establish the database connection with the other physical database.

21. The computer program product of claim 14, further comprising computer program code for causing at least one processor operating at the data access layer prior to redirecting the data transaction request to consult a router to select the other physical database for handling the data transaction request.

22. The computer program product of claim 21, wherein the computer program code for causing at least one processor to consult a router comprises computer program code for causing at least one processor to initialize a routing framework for implementing at least one routing rule.

23. The computer program product of claim 21, wherein the computer program code for causing at least one processor to consult a router comprises the computer program code for causing at least one processor to initialize a routing framework for implementing a plurality of routing rules and at least one default routing rule.

24. The computer program product of claim 14, further comprising computer program code for causing at least one processor to perform the steps of:
establishing a pool of available connections between a set of web servers and a set of logical database constructs; and
establishing a pool of available connections for the plurality of physical databases.

25. The computer program product of claim 24, wherein:
the computer program code for causing at least one processor to perform the step of establishing a connection between the web server and a logical database construct comprises computer program code for causing at least one processor to obtain a connection from a connection pool; and
the computer program code for causing at least one processor to perform the step of establishing a database connection with the other physical database comprises computer program code for causing at least one processor to obtain a connection from a connection pool.

26. The computer program product of claim 24, further comprising computer program code for causing at least one processor to, responsive to unavailability of the other physical database, move at least one available connection from the other physical database to further physical database selected from among the plurality of physical databases.

27. A system for performing a data transaction with respect to data stored in a plurality of databases, comprising:
   a plurality physical database; and
   a data access layer comprising a plurality of DAL servers, for:
      establishing a plurality of logical database constructs, each of the plurality of logical database constructs having default routing to one of the plurality of physical databases as a default physical database, such default routing specifying a default physical database as a default destination for forwarding a data transaction request received at the logical database construct;
      receiving a database connection request from a web server;
      establishing a connection between the web server and a logical database construct based on the contents of the database connection request;
      receiving a data transaction request from the web server on the database connection between the web server and the logical database construct;
      redirecting the data transaction request from the default physical database for the logical database construct to another physical database, the data transaction request being redirected based on routing rules that override the default routing for the logical database construct;
      establishing a database connection with the other physical database;
      transmitting the data transaction request to the other physical database;
      receiving a result set from the other physical database; and
      returning the result set to the web server.

28. The system of claim 27, further comprising:
   a load balancer, for:
      selecting a DAL server to receive the database connection request from a web server; and
      routing the database connection request to the selected DAL server;
   and wherein the selected DAL server establishes the database connection, transmits the data transaction request, receives the result set, and returns the result set.

29. The system of claim 27, wherein the data access layer converts the data transaction request to a format compatible with the database connection to the other physical database.

30. The system of claim 27, wherein the result set comprises at least one database object.

31. The system of claim 30, wherein, prior to returning the result set to the web server, the data access layer converts the at least one database object to a format compatible with the database connection between the web server and the logical database construct.

32. The system of claim 27, wherein the data access layer receives a database connection request from a web server by receiving a database connection directed to at least one of the established logical database constructs.

33. The system of claim 27, wherein:
   the data access layer establishes a connection between the web server and the logical database construct by:
      receiving a request for a DAL driver;
      providing the DAL driver; and
      using the DAL driver to establish the connection between the web server and the logical database construct;
   and wherein:
   the data access layer establishes a database connection with the other physical database by:
      issuing a request for a database driver;
      obtaining the database driver; and
      using the database driver to establish the database connection with the other physical database.

34. The system of claim 27, further comprising:
   a router, communicatively coupled to the data access layer, for selecting the other physical database for handling the data transaction request.

35. The system of claim 34, wherein the data access layer consults the router by initializing a routing framework for implementing at least one routing rule.

36. The system of claim 34, wherein the data access layer consults the router by initializing a routing framework for implementing a plurality of routing rules and at least one default routing rule.

37. The system of claim 27, wherein the data access layer:
   establishes a pool of available connections between a set of web servers and a set of logical database constructs; and
   establishes a pool of available connections for the plurality of physical databases.

38. The system of claim 37, wherein the data access layer:
   establishing a connection between the web server and a logical database construct by obtaining a connection from a connection pool; and
   establishing a database connection with the other physical database by obtaining a connection from a connection pool.

39. The system of claim 37, wherein, responsive to unavailability of the other physical database, the data access layer moves at least one available connection from the other physical database to a further physical database selected from among the plurality of physical databases.

* * * * *